Patented Oct. 22, 1946

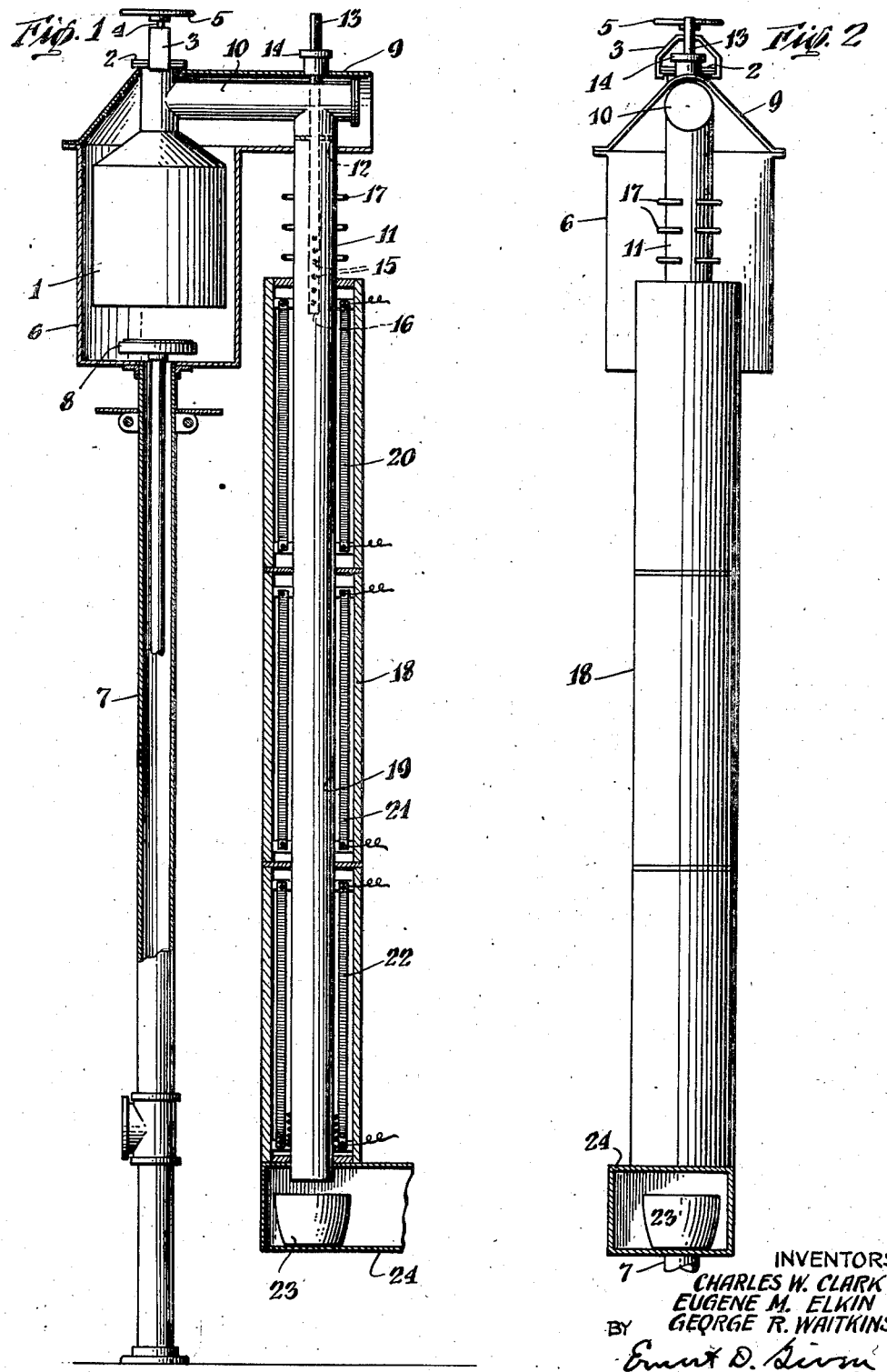

2,409,835

UNITED STATES PATENT OFFICE 2,409,835

PROCESS FOR PRODUCING PURE SELENIUM

Charles W. Clark, Westmount, Quebec, and Eugene M. Elkin, Montreal, Quebec, Canada, and George R. Waitkins, Flemington, N. J., assignors to Canadian Copper Refiners Limited, Montreal East, Quebec, Canada, a corporation of Canada Application October 25, 1945, Serial No. 624,506

14 Claims. (Cl. 23—209)

The present invention relates to an improved method or process of making selenium of high purity.

Selenium is produced mainly from anode mud or slimes formed during the electrolytic refining of copper and lead. Various methods have been employed commercially in recovering selenium from these slimes, but all prior methods yield a product contaminated to a certain extent with other constituents of the slimes.

The presently established practice of the prior art is to refine the crude selenium obtained from the slimes by distillation. However, even after several successive distillations the product still contains appreciable amounts of impurities such as iron, copper, tellurium, sulphur, silicon and other materials. Some of these impurities are considered to have an adverse effect on the electrical properties of selenium, and consequently are considered to be objectionable by the makers of such electrical equipment as rectifiers, condensers, cells, etc. into which elemental selenium is incorporated. A more nearly pure product may be obtained by subjecting the crude selenium to vacuum distillation. However, due to the strong tendency of selenium to form alloys and/or other compounds with almost all elements, such vacuum distillation must be performed in apparatus made of fused quartz. This method is employed on a commercial scale, but is quite expensive both as to initial cost of equipment and cost of operation. Furthermore, the product obtained by the practice of this method is not always uniform.

The present invention specifically provides an improved method or process of making selenium of high purity. This can be done by first oxidizing relatively impure selenium to form selenium dioxide ($SeO_2$). The process for carrying out this phase of the operation is disclosed in the copending application of Clark and Elkin, Serial No. 599,840, filed June 16, 1945, entitled "Process for making selenium dioxide." The present invention provides for the reduction of the selenium dioxide so produced in a high state of purity, to produce at least equally pure elemental selenium.

A primary object of the present invention, therefore, is to provide a process for producing selenium of high purity by a chemical reduction of selenium dioxide solely in a gaseous phase by the use of ammonia, followed by the selective condensing of the resultant selenium and the consequent separation thereof from the other products of the reaction.

Further and more detailed objects of the present invention include the provision of a process of the character described, including specific process steps insuring the proper and safe operation of the process, providing for the carrying out of this process in such a manner that the selenium formed thereby will be of a high degree of purity, and providing the necessary conditions affecting the reaction so as to control it to the desired end of producing selenium which will be satisfactory for all uses for which highly pure elemental selenium is required, particularly for uses in the electrical industry.

Other and more detailed objects of the present invention will become apparent from the following specification and appended claims, when considered in connection with the accompanying drawing, in which:

Figure 1 is a view partly in elevation and partly in central vertical section illustrating somewhat diagrammatically an apparatus for the carrying out of a process in accordance with the present invention; and Fig. 2 is a view of the apparatus of Fig. 1 as seen from the right in that figure, the view being substantially in side elevation.

It has previously been proposed to reduce solid selenium dioxide with ammonia, but this was, as far as we have been able to ascertain, never effected with all the products in a gaseous state, and as a solely gaseous reaction. When the applicants attempted to reduce solid selenium dioxide with ammonia, the surface portion was reduced, but the reaction was blocked by the resultant surface layer of elemental selenium, so that the product was mostly unreduced selenium dioxide. We further found that in attempting to carry out such reaction, substantial difficulties were encountered in that reactions generally occurred of an explosive character exposing the equipment to damage and the operating personnel to injury. It is our theory, which, however, is not relied upon specifically herein, that these explosions resulted from the decomposition of nitrogen selenide, formed as an intermediate product of the reaction.

We have found that by carrying out the reaction solely in a gaseous phase and by maintaining in the reaction chamber at least a stoichiometric proportion of ammonia, the reaction can be caused to take place smoothly and without danger of explosions or other undesired results. This reaction takes place in accordance with the equation $$3SeO_2 + 4NH_3 = 6H_2O + 3Se + 2N_2$$

The stoichiometric proportions above mentioned are 4 mols of ammonia to 3 mols of selenium dioxide. In accordance with the present invention, there will always be present in the reaction chamber sufficient ammonia so as to maintain at least these proportions and preferably sufficient ammonia to provide a slight excess of ammonia to insure the reaction taking place as desired. The reaction above set forth of reducing selenium dioxide with ammonia in accordance with the present invention is quite vigorous and is exothermic in character. In practice it takes place with the evolution of light and much heat. By controlling the amount and proportions of the reacting materials and the rate of the reaction, the light given off may be varied from a bright flame to a faint glow. The reaction in accordance with the present invention should take place at a temperature above the vaporization point of selenium dioxide, i. e., above 603° F. (substantially the sublimation temperature of selenium dioxide) and preferably from that temperature to about 800° F., although higher temperatures may be employed if found desirable.

The reaction may be caused to take place intermittently or continuously as may be desired, but is preferably continuous, operated so that the various reaction conditions may be stabilized and maintained at desired points.

The selenium dioxide employed as one of the starting products of the reaction may be introduced as a vapor or gas, or may be caused to flash into such vapor or gas from a dispersed cloud of the selenium dioxide itself or an aqueous solution thereon introduced as by spraying into the reaction chamber. If desired, it may be introduced directly from an intermediate stage of the process set forth in application Serial No. 599,840, at which time the selenium dioxide is in a gaseous condition and is mixed with other gases. In the event this is done and some of the other gases so introduced are oxidizing in character, it may be necessary to provide enough additional ammonia to establish and maintain the desired reducing atmosphere.

The ammonia used in accordance with this invention may be introduced as gaseous ammonia or as a spray of a water solution of ammonia, which flashes into a gaseous condition in the highly heated reaction chamber. The rate of the reaction and the consequent heat evolved therefrom and other temperature controlling conditions are preferably so balanced as to maintain in the reaction chamber a desired condition of temperature. To this end it may sometimes be found necessary to add heat to the reaction chamber in addition to that resulting from the reaction itself, or to reduce the rate of heat dissipation therefrom, or to do both separately or in combination.

Once the reaction has taken place in a gaseous state as hereinabove set forth, the resultant products are passed to a condensing zone, wherein selective condensation takes place, preferably such that the resultant selenium will be condensed, without condensing any of the other products of the reaction. To this end the temperature in the condensing zone should be maintained between about 422.5° F., and about 500° F., the lower limit only of this zone being at all critical and being substantially the melting point of pure selenium. We prefer, however, to operate the condensing zone of the apparatus in a temperature range between about 423° F. and about 450° F. Under these conditions the selenium is maintained in a liquid state, condensing on the walls of the condensing zone and flowing to a suitable collection point along said walls. The other products of the reaction, which are still gaseous at the temperatures maintained as aforesaid, may then be discharged to the atmosphere or otherwise suitably disposed of.

In the accompanying drawing there is illustrated in a more or less diagrammatic manner a commercial apparatus for carrying on a process in accordance with the present invention. In this process, as thus carried on in the apparatus shown in the drawing, solid selenium dioxide, which may be produced by the process of the above entitled application, Serial No. 599,840, is vaporized by heat. The vapor therefrom is then conducted to a reaction chamber, wherein it is mixed with gaseous ammonia with which it reacts in the reaction chamber in accordance with the equation given above. The products of the reaction are then conducted to a condensing chamber wherein the selenium produced is condensed to a liquid, the temperature in the condensing chamber being kept above the melting point of pure selenium, i. e., above about 423° F.

As shown in the accompanying drawing, there is provided a chamber 1 to which solid selenium dioxide may be supplied from time to time through a filling opening at the upper end thereof. This opening is closed by a suitable cover 2 secured in place during normal operation by a screw clamp means including a bracket member 3 having portions engaging beneath a flange on which the cover 2 seats. The bracket member 3 and cover 2 are held in position by a screw 4 threaded through the bracket member 3 and engaging the cover 2, the screw 4 being provided with a hand wheel 5 for tightening and loosening it, as may be desired.

The chamber 1 is completely enclosed in a suitable housing 6 supported upon a standpipe 7 through which gas and air may be supplied to a suitable burner 8, the gas being supplied from a suitable source under pressure and the air being supplied from a suitable source under pressure or directly from the atmosphere. Products of combustion pass around the chamber 1 within the housing 6, and thence pass through a lateral extension 9 of the housing 6 to some suitable exhaust point such as a stack (not shown). Thus, there is provided a chamber for the solid selenium dioxide and a means for supplying heat thereto for vaporizing it to form gaseous selenium dioxide, which is one of the ingredients entering the reaction chamber.

Suitable means (not shown) may be provided for ascertaining and/or controlling the temperature within the chamber 1, so as to insure the proper vaporization of the selenium dioxide in a manner which will be obvious to those skilled in the art.

The selenium dioxide vapor from the chamber 1 passes through a lateral duct 10 leading from the upper portion of the chamber 1 to a reaction chamber generally indicated at 11. The chamber 11 is shown as the upper end portion of a tubular member, lower portions of which serve as a condensing zone or chamber as hereinafter to be described. The parts for contact with the selenium dioxide vapor, ammonia and reaction products thereof and including the duct 10 and reaction chamber 11 may be formed of any suitable material. We have found, however, that stainless steel or heat-resistant glass are suitable for this purpose. If desired, any combination of these two materials for forming the several parts may be used as may be found desirable. A suitable screen 12 may be provided between the interior of the duct 10 and the reaction chamber 11, this screen being provided with a desired number of apertures of suitable size to permit a desired flow of gaseous selenium dioxide to the reaction chamber.

Ammonia gas is introduced into the reaction chamber through a tube 13 passing through a suitable fitting 14 adjacent to its upper end, and thence through the wall of the duct 10 and downwardly centrally of and substantially concentric with the wall of the reaction chamber 11, which may be cylindrical in contour. The lower end portion of the tube 13 is preferably perforated at 15, this tube preferably being closed at its lower end at 16.

The ammonia gas may be supplied from any suitable source thereof (not shown), the supply being suitably accurately controlled by manual or automatic adjusting means, also not shown herein, so as to insure the presence in the reaction chamber of an adequate amount of ammonia gas to react with all the selenium dioxide being supplied thereto as aforesaid, and preferably to provide a slight excess of such ammonia gas, so that there will be, both in the reaction chamber and in the condensing chamber hereinafter described, a reducing atmosphere. For this purpose the rate of supply of ammonia gas is such as to provide a stoichiometric excess of this material.

In the event that the heat generated by the reaction itself, as aforesaid, is insufficient to maintain the reaction chamber at a desired high temperature range as set forth herein above, suitable heating means may be provided for use in connection therewith. As shown, such means may include electric heating elements 17 of the type known in the art as "Calrods." It is contemplated, however, that any other desired means may be employed for this purpose as may be found necessary or sufficient in use.

The lower portions of the tubular body, the upper part of which forms the reaction chamber 11 as aforesaid, may serve in practice as the condensing chamber for the selenium produced in accordance with this invention. For this purpose such lower portion is enclosed within the outer casing 18, which may be of any desired cross sectional shape, including square, and may include between itself and the tube, here indicated at 19, a plurality of heating means here shown as electrical resistance heating elements 20, 21 and 22, suitable temperature control means, manual or automatic in nature, being associated with the current supply for the elements 20, 21 and 22 in a manner not shown, but which may be conventional or of any desired arrangement or design, so as to maintain the temperatures within the condensing portion of the tube 19 in a desired temperature range, which in the present instance is between the melting point of pure selenium (about 422.5° F.) and about 500° F., and preferably not over about 450° F.

In this condensing chamber, the selenium is condensed to a liquid which collects on the interior wall of the tube 19, and runs down that wall into a suitable receptacle generally indicated at 23 arranged beneath the lower end of the tube 19. Inasmuch as space is provided between the lower end of the tube 19 and the receptacle 23, uncondensed gases may pass out through this space and thence through the open end of a chamber 24, a part only of which is shown, to a suitable disposal point for these uncondensed gases, which may in practice be a stack. If desired, however, some suitable means may be employed for condensing water from the gases or scrubbing them with an aqueous liquid so as to prevent the discharge of ammonia to the atmosphere.

We have found that selenium may be produced in this manner with total impurities less than ten parts per million under ordinary operating conditions. In operations carried on in accordance with the present invention selenium can be and has been produced thereby, which on analysis showed impurities therein to be as follows:

| | Parts per million |
|---|---|
| Copper | 0.1 |
| Iron | 0.1 |
| Tellurium | Less than 1.0 |
| Non-volatile residue | Less than 5 |
| Selenium dioxide | 0 |

From the above it will be seen that we have provided a practical commercial process for the preparation of elemental selenium of high purity, which process may be carried on simpler and cheaper than prior art processes and with substantially complete safety for the apparatus used and the using personnel. The product produced in accordance with this process is of extremely high purity, and as such is adequate for many electrical uses requiring elemental selenium substantially uncontaminated by other materials. While there is shown and described herein but one apparatus for carrying out the process, various modifications of the process itself have been set forth hereinabove. We contemplate that further variants of this process may be made within the spirit and scope of the appended claims, which are to be construed validly as broadly as the state of the prior art permits.

What is claimed is:

1. The process of making elemental selenium of high purity, which comprises the steps of reducing selenium dioxide with at least a stoichiometrically equivalent amount of ammonia in the gaseous phase at a temperature at least 603° F. to produce selenium and other reaction products, and thereafter selectively condensing out elemental selenium at a temperature substantially above the boiling points of the other products of the reducing reaction.

2. The process of making elemental selenium of high purity, which comprises the steps of reducing selenium dioxide with at least a stoichiometrically equivalent amount of ammonia in the gaseous phase at a temperature at least 603° F., and thereafter selectively condensing out elemental selenium at a temperature range in the order of about 423° to about 500° F.

3. The process of making elemental selenium of high purity, which comprises the steps of reducing selenium dioxide with at least a stoichiometrically equivalent amount of ammonia in the gaseous phase at a temperature at least 603° F., and thereafter selectively condensing out elemental selenium at a temperature range in the order of about 423° to about 450° F.

4. The process of making elemental selenium of high purity, which comprises the steps of vaporizing selenium dioxide, conducting the vapor thus produced to a reaction chamber, separately introducing at least a stoichiometric amount of ammonia into the reaction chamber, maintaining the reaction chamber at a temperature at least 603° F., so that the reaction between the selenium dioxide and the ammonia will take place solely in the gaseous phase, and thereafter selectively condensing out purified elemental selenium at a temperature above the boiling points of the other reaction products.

5. The process in accordance with claim 4, wherein the selenium is selectively condensed out as a liquid at a temperature substantially above the boiling point of the other products of the reaction and above the melting point of pure selenium.

6. The process in accordance with claim 1, wherein the ammonia is introduced in gaseous form to the place where the reducing action takes place.

7. The process in accordance with claim 1, wherein the ammonia is introduced in the form of an aqueous solution of ammonia to the place where the reducing reaction takes place.

8. The process of making elemental selenium of high purity, which comprises introducing selenium dioxide in finely sub-divided form into a reaction chamber, introducing at least a stoichiometric amount of ammonia into said reaction chamber, maintaining said reaction chamber at a temperature at least as high as the sublimation temperature of selenium dioxide and thereby causing substantially solely a gaseous phase reaction between the selenium dioxide and the ammonia, and thereafter selectively condensing substantially pure elemental selenium out of the other gaseous materials present in a temperature range substantially above the boiling point of any of such other materials.

9. The process of claim 8, wherein the condensing temperature is in the range of about 423° to about 450° F.

10. The process of claim 8, wherein both the selenium dioxide and the ammonia are continuously introduced into said reaction chamber, and purified selenium is continuously condensed from the reaction products therefrom.

11. The process of claim 8, wherein the ammonia is supplied in a proportion to the amount of selenium dioxide in excess of the stoichiometric ratio.

12. The process of claim 8, wherein said selenium dioxide is introduced into said reaction chamber in the form of a water solution.

13. The process of claim 8, wherein the ammonia is introduced into said reaction chamber in the form of a water solution.

14. The process of claim 8, wherein both the selenium dioxide and the ammonia are introduced into said reaction chamber in the form of water solutions.

CHARLES W. CLARK.
EUGENE M. ELKIN.
GEORGE R. WAITKINS.